United States Patent
Basham et al.

(10) Patent No.: US 10,831,615 B2
(45) Date of Patent: Nov. 10, 2020

(54) AUTOMATED REGULATION COMPLIANCE FOR BACKUP AND RESTORE IN A STORAGE ENVIRONMENT

(71) Applicant: International Business Machines Corporation, Armonk, NY (US)

(72) Inventors: Robert B. Basham, Beaverton, OR (US); Anbazhagan Mani, Bangalore (IN); Harold J. Roberson, II, Rochester, MN (US); Dileep Dixith, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/261,077

(22) Filed: Jan. 29, 2019

(65) Prior Publication Data
US 2020/0241975 A1    Jul. 30, 2020

(51) Int. Cl.
*G06F 11/14* (2006.01)
*G06F 21/62* (2013.01)

(52) U.S. Cl.
CPC ...... *G06F 11/1469* (2013.01); *G06F 11/1415* (2013.01); *G06F 21/62* (2013.01)

(58) Field of Classification Search
CPC ...... G06F 3/067; G06F 21/00; G06F 21/6245; G06F 21/577; G06F 2221/2101; G06F 3/0634; G06F 16/125; G06F 11/1469; G06F 11/1415; G06F 21/62
See application file for complete search history.

(56) References Cited

U.S. PATENT DOCUMENTS

| | | |
|---|---|---|
| 2017/0243028 A1 | 8/2017 | LaFever et al. |
| 2018/0039794 A1 | 2/2018 | Sher-Jan |
| 2018/0075138 A1 | 3/2018 | Perram et al. |
| 2019/0050210 A1* | 2/2019 | Van Der Jeugt ........ G06F 8/447 |
| 2019/0075082 A1* | 3/2019 | Adam .................... H04L 63/20 |
| 2019/0104156 A1* | 4/2019 | Barkovic ............... H04L 41/22 |

OTHER PUBLICATIONS

Pietro Ferrara et al., "Static Analysis of GDPR Compliance", ITASEC, 2018, ceur-ws.org, vol. 2058, 2018, pp. 1-10.

* cited by examiner

*Primary Examiner* — Idriss N Alrobaye
*Assistant Examiner* — Richard B Franklin
(74) *Attorney, Agent, or Firm* — Kunzler Bean & Adamson (57) ABSTRACT

Methods and systems for automated regulation compliance for backing up and restoring in a storage environment are provided. A system for providing automated regulation compliance for backing up and restoring in a storage environment includes an analyzer module that determines if a storage system complies with regulations. The system includes a converter module that converts the storage system to comply with the regulations in response to determining that the storage system does not comply with the regulations. The system includes a validator module that validates that the converted storage system complies with the regulations.

17 Claims, 5 Drawing Sheets

AUTOMATED REGULATION COMPLIANCE FOR BACKUP AND RESTORE IN A STORAGE ENVIRONMENT

FIELD

This invention relates to the backup and restoring of data in a storage environment and more particularly relates to methods and systems for automated regulation compliance for backup and restore in a storage environment.

BACKGROUND

Backup and restore software may provide mechanisms where storage system data can be backed-up and stored in secondary locations. For example, the data may be backed-up and stored on the cloud, a hard disk, a tape, and the like. When disaster or data corruption affects the data stored on storage devices associated with the location of the disaster, data stored on other storage devices not affected by the disaster or corruption may be used to restore the affected data.

In certain embodiments, governmental entities have established regulations for data protection and individual privacy. Further, the regulations may address the export of personal data outside territories controlled by the governmental entities. Further, when multiple governmental agencies agree to a common regulation, the regulation may affect the extent to which citizens and residents control their personal data and the regulatory environment for businesses.

SUMMARY

Methods and systems for automated regulation compliance for backing up and restoring in a storage environment are provided. A system for providing automated regulation compliance for backing up and restoring in a storage environment includes an analyzer module that determines if a storage system complies with regulations. The system includes a converter module that converts the storage system to comply with the regulations in response to determining that the storage system does not comply with the regulations. The system includes a validator module that validates that the converted storage system complies with the regulations.

In certain embodiments, the analyzer module determines that the storage system complies with regulations based on analyzing attributes of the storage system. Additionally, the attributes of the storage system are selected from the group consisting of a storage system extended attribute, access control settings for the storage system, and an enterprise security level.

In further embodiments, the converter module determines whether the storage system can be converted to comply with the regulations before restoration of the storage system. The converter module performs the restoration of the storage system after the storage system is converted based upon the determination of whether the storage system can be converted before the restoration the storage system.

In additional embodiments, the regulations are specified as part of general data protection regulation (GDPR). Further, the analyzer module determines that the storage system complies with the regulations based on one or more articles defined in the regulations. The analyzer module also uses a decision tree to determine whether the storage system complies with the one or more articles.

One method includes determining if a storage system complies with regulations. The method also includes converting the storage system to comply with regulations in response to determining that the storage system does not comply with regulations. Further, the method includes validating that the converted storage system complies with regulations.

In certain embodiments, determining if a storage system complies with regulations further includes determining that the storage system complies with regulations based on analyzing attributes of the storage system. The attributes of the storage system are selected from the group consisting of a storage system extended attribute, access control settings for the storage system, and an enterprise security level.

In further embodiments, converting the storage system further includes determining whether the storage system can be converted to comply with the regulations before restoration of the storage system. Additionally, the restoration the storage system after the storage system is converted is performed based upon the determination of whether the storage system can be converted before the restoration of the storage system.

In additional embodiments, the regulations are specified as part of general data protection regulation (GDPR). Further, determining if a storage system complies with regulations includes determining that the storage system complies the regulations based on one or more articles defined in the regulations. Also, determining if a storage system complies with regulations includes using a decision tree to determine whether the storage system complies with the one or more articles.

Also, disclosed are computer program products including a computer-readable storage medium that include program instructions embodied therewith for automated regulation compliance for backing up and restoring in a storage environment. Some program instructions executable by a processor cause the processor to determine if a storage system complies with regulations. Further, the program instructions cause the processor to convert the storage system to comply with the regulations in response to determining that the storage system does not comply with the regulations. Also, the program instructions cause the processor to validate that the converted storage system complies with the regulations.

In certain embodiments, the program instructions further cause the processor to determine that the storage system complies with regulations based on analyzing attributes of the storage system. Also, the program instructions cause the processor to determine whether the storage system can be converted to comply with the regulations before restoration of the storage system. Additionally, the program instructions cause the processor to perform the restoration the storage system after the storage system is converted based upon the determination of whether the storage system can be converted before the restoration of the storage system.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Disclosed herein are various embodiments providing methods, systems, and computer program products that can provide automated regulation compliance for backup and restore in a storage environment. Notably, the language used in the present disclosure has been principally selected for readability and instructional purposes, and not to limit the scope of the subject matter disclosed herein in any manner.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several storage devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

The description of elements in each figure below may refer to elements of proceeding figures. For instance, like numbers can refer to similar elements in all figures, including alternate embodiments of similar elements.

Figure 1:
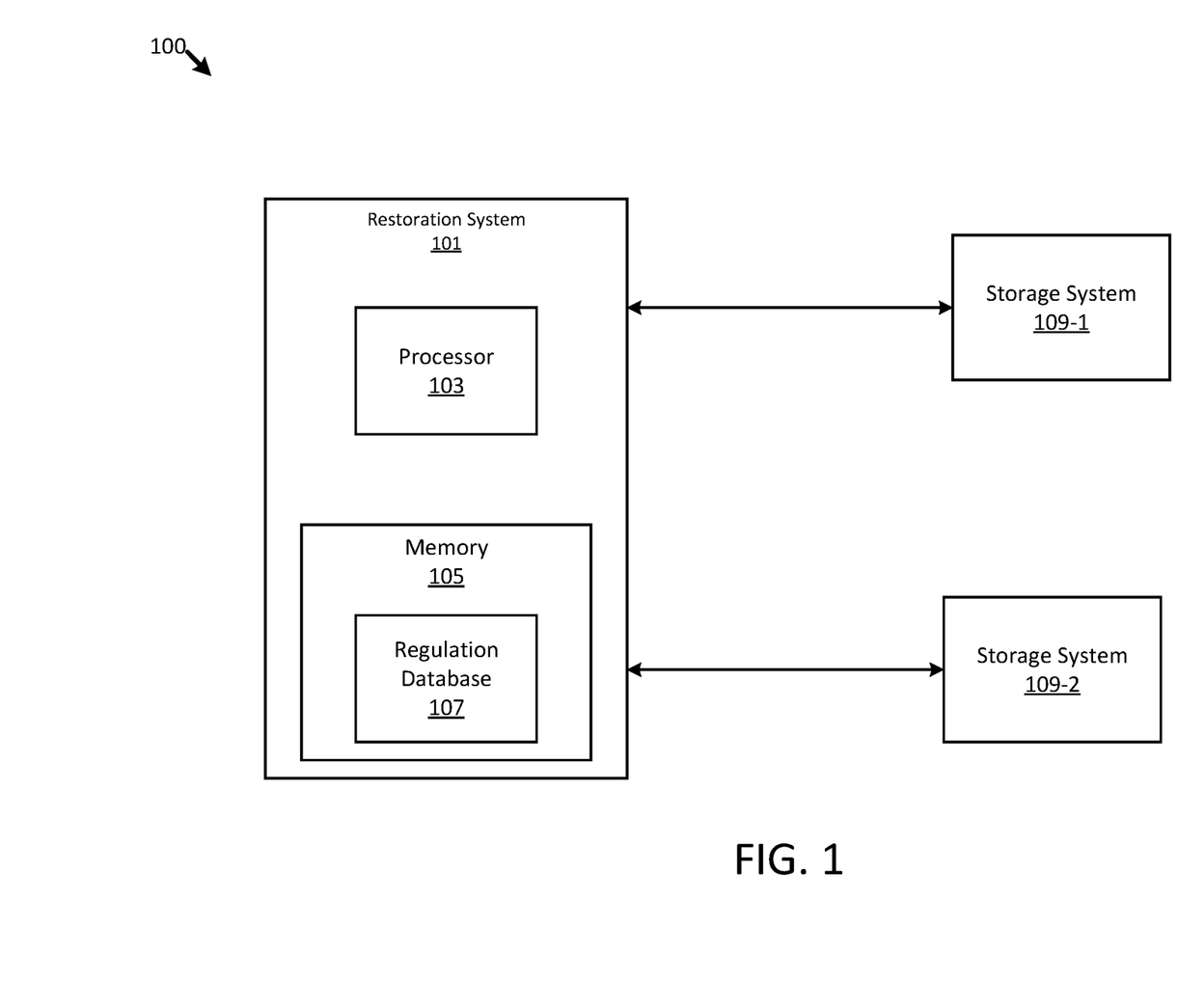
FIG. 1 is a block diagram of one embodiment of a computing system for automatically ensuring regulation compliance for backing up and restoring storage system data in a storage environment.

With reference now to the figures, FIG. 1 is a block diagram of one embodiment of a computing system 100 for automatically ensuring regulation compliance for backing up and restoring storage system data in a storage environment. For example, the computing system 100 may include a restoration system 101 and one or more storage systems 109. As illustrated, the computing system 100 may include a first storage system 109-1 and a second storage system 109-2, where a storage system may be referred to generally as a storage system 109 or storage systems 109. As used herein, a storage system 109 may refer to a method of organizing and retrieving data and files from a storage medium such as a hard drive, a storage array, a data center, and the like. For example, the storage system 109 may be a filesystem, an object storage, and the like.

In certain embodiments, data on a storage system 109 may be periodically backed-up at one or more locations. For example, the storage system 109-1 and the storage system 109-2 may be located at different locations and the data stored on storage system 109-1 is also stored on storage system 109-2. Alternatively, the data stored on the storage system 109-1 and the storage system 109-2 may be different and they may be backed-up at another location or at the same location where the storage system 109 exists.

In certain embodiments, a storage system 109 may be in communication with a restoration system 101. As used herein, the restoration system 101 may be a system for restoring data on a storage system 109 that has been lost, damaged, or corrupted. In certain embodiments, the restoration system 101 may include a processor 103 and a memory 105. As used herein, the processor 103 may refer to an electrical device capable of executing computer readable instructions. For example, the processor 103 may be a multicore processor, a single CPU, a collection of computing devices, or other electronic device or group of electronic devices capable of executing computer readable instructions.

In some embodiments, memory 105 and the storage systems 109 may be stored on one or more different storage devices. The storage devices may include any suitable type of storage device or cluster of storage devices that are known or developed in the future that can store computer-usable data. In various embodiments, the storage devices may include one or more non-transitory computer-usable mediums (e.g., readable, writable, etc.), which may include any non-transitory apparatus or device that can contain, store, communicate, propagate, and/or transport instructions, data, computer programs, software, code, routines, etc., for processing by or in connection with directions from a respective controlling electronic device, such as the processor 103 or site controller for the storage systems 109.

In certain embodiments, memory storage on the storage devices used by the memory 105 and the storage systems 109 may be implemented as direct-access storage devices (DASD). The memory storage, in further embodiments, may include non-transitory memory such as, for example, flash memory (e.g., a solid-state device (SSD) or other non-volatile storage devices that store persistent data), a dynamic random access memory (DRAM) device, an enhanced dynamic random access memory (EDRAM) device, a static random access memory (SRAM) device, a hard disk drive (HDD), a near-line drive, tape drive (e.g., magnetic and/or virtual), and/or other type(s) (e.g., non-volatile and/or persistent) of memory devices, etc. that are possible and contemplated herein.

In some embodiments, the storage devices may include a cluster of separate storage devices that are configured to store data. For example, the storage systems 109 may be networked storage systems, parallel storage systems, or other types of storage systems where multiple computing devices access the memory storage of the storage systems 109. In various embodiments, the storage devices used by the memory 105 and the storage systems 109 may include non-volatile/persistent hardware and/or software configured to perform long-term data storage operations, including, but not limited to, data archiving, data backup, data mirroring, replicating data, etc. For instance, the storage devices may include non-volatile and/or persistent hardware and/or software to perform long-term data storage operations, which may include write operations, read operations, read-write operations, etc., among other operations.

In further embodiments, the memory 105 may include a regulation database 107. As used herein, the regulation database 107 may refer to a collection of rules stored in the memory 105 that may be enforced by the restoration system 101 when restoring a storage system 109. In certain embodiments, the regulations stored by the regulation database 107 may serve to protect the data and/or the owners/individuals associated with the data stored on a storage system 109. For example, storage systems 109 may store personally sensitive data regarding individuals.

In the current technological era, there has been a proliferation of data that may be used to identify individuals and if used incorrectly may cause harm to individuals associated with the data. Personal data that may be used to identify individuals may include, but is not limited to, names, home addresses, email addresses, national identification numbers, passport numbers, IP addresses, social security numbers, bank account numbers, vehicle registration plate numbers, driver's license numbers, face images, fingerprints, handwriting samples, credit card numbers, digital identity, date of birth, birthplace, genetic information, telephone numbers, electronic login names, screen names, nicknames, online handles, and the like. Due to the threat posed by malevolent actors accessing personal data, government agencies have enacted regulations that govern the handling of personal data. However, privacy concerns and regulations may vary by country and in some situations, the privacy concerns vary within different regions within a country. Also, compliance with the regulations may govern the movement of data from one region to another rather than the just the transformation of the data.

An example of a regulation that has been enacted by a governing body to control the handling of personal data is the General Data Protection Regulation (GDPR), enacted by the European Union. The intent of the GDPR is to strengthen and unify data protection for the individuals within the European Union. The GDPR also controls the exportation of personal data outside the European Union. Some objectives of the GDPR are to provide citizens and residents control of their personal data and simplify the regulatory environment by unifying regulations within the European Union. Companies and organizations that store personal data are required to comply with the GDPR or be subject to fines and/or other penalties.

In certain embodiments, data may have been saved on a storage system 109 before the beginning of the enforcement of a regulation that applies to data stored on the storage system 109. Accordingly, when the data is restored on the storage system 109 by the restoration system 101, the restoration system 101 may potentially restore the data such that the data does not comply with applicable regulations. Thus, when the restoration system 101 restores the data on one or more of the storage systems 109, the restoration system 101 may attempt to use information stored in the regulation database 107 to ensure that the data stored on the storage systems 109 complies with governing regulations.

Figure 2:
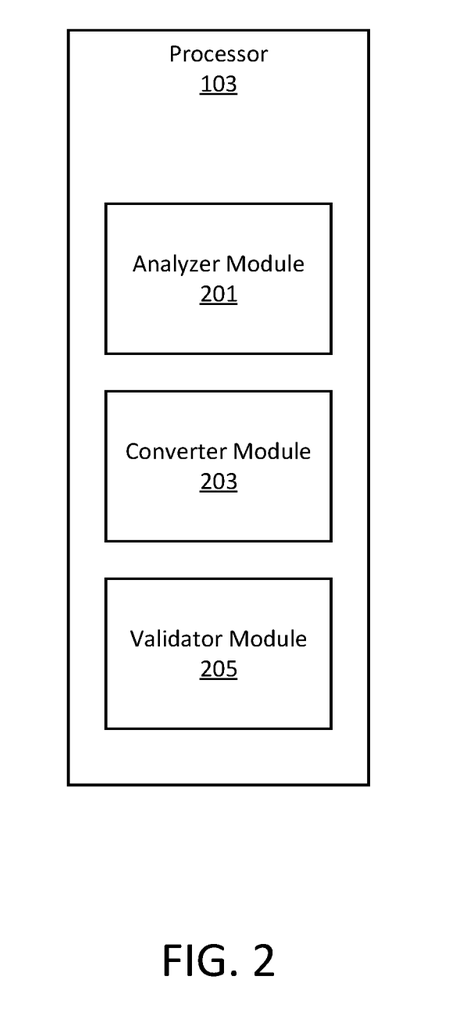
FIG. 2 is a block diagram illustrating an embodiment of a processor configured to provide automatic regulation compliance for backing up and restoring storage system data in a storage environment.

FIG. 2 is a block diagram illustrating an embodiment of a processor 103 for providing automatic regulation compliance for backing up and restoring storage system data in a storage environment. In certain embodiments, as used herein, the processor 103 may be a general-purpose computer, special purpose computer, multiple processors, or other programmable data processing apparatus. In some embodiments, the processor 103 may be one or more processors on the restoration system 101 capable of directing the restoration of data on the storage systems 109 as described above in connection with FIG. 1. For example, the processor 103 may include an analyzer module 201, a converter module 203, and a validator module 205. As described herein, the analyzer module 201 may determine if a storage system 109 complies with regulations. Further, as described herein, the converter module 203 may convert the storage system 109 to comply with the regulations in response to determining that the storage system 109 does not comply with the regulations. Additionally, as described herein, the validator module 205 may validate that the converted storage system 109 complies with the regulations.

In certain embodiments, the analyzer module 201 may analyze and determine whether stored data is configured to comply with a regulation specified in the regulation database 107. For example, a storage system 109 may store data that may be reviewed by the analyzer module 201 to determine whether or not the data stored on the storage system 109 complies with a specific regulation.

In some embodiments, the storage system 109 may store information regarding regulation compliance in one or more fields that store extended attributes. An extended attribute, as defined herein may refer to an additional data field describing the storage system 109 or a portion of the storage system 109. With regards to regulation compliance, the extended attribute may be defined to indicate compliance with regulations when a particular value is stored within the extended attribute. In some embodiments, the extended attribute may store multiple indicators, where the separate indicators indicate compliance with a specific portion of the regulations and the analyzer module 201 determines that the storage system 109 complies with the regulations when the separate indicators indicate compliance. Accordingly, the analyzer module 201 may use information stored in an extended attribute to determine whether or not the data stored on a storage system 109 complies with regulations.

In further embodiments, the analyzer module 201 may check access control settings for the storage system 109 to determine whether or not the storage system 109 complies with regulations. As defined herein, access control settings may refer to defined settings for the storage system 109 that control access to the data stored in the storage system 109. For example, an access control setting may define who has access to data, who can write data, who can delete data, or who can perform other file operations. The access control settings may indicate the level of access for portions of the data or for all the data stored in the storage system 109.

In additional embodiments, the analyzer module 201 may check an enterprise security level for the storage system 109 determine whether or not the storage system 109 complies with regulations. As defined herein, an enterprise security level may define a security level of an enterprise network, where enterprise network is a network that connects computing devices throughout an organization.

In certain embodiments, the analyzer module 201 may collect multiple rules or articles for the governing regulation. As defined herein, an article may refer to a section of the regulation. The analyzer module 201 may determine whether or not the data stored on the storage system 109 satisfies the requirements put forth by the article. As defined herein, a rule may refer to a list item for a requirement indicating what is and isn't allowed with respect to data stored on a storage system 109. In certain embodiments, an article of a governing regulation may define a rule. Alternatively, a governing regulation may define rules independent from the articles of a governing regulation. Accordingly, the analyzer module 201 may determine whether or not the storage system 109 complies with a particular governing regulation.

In some embodiments, the analyzer module 201 may use a decision tree to determine whether or not data complies with a governing regulation. For example, after identifying the rules and articles related to the regulation, the analyzer module 201 may process each of the different articles in a target environment during the restoration of the data. As used herein, a decision tree may refer to an algorithm that models decisions and their possible consequences. By using a decision tree, an attribute may be selected along a dimension that provides better splits. Further, the decision tree may be used to create child nodes based on the splits and recurse on each child node until a stopping criteria is reached. Also, decision trees with prediction capabilities may be used to predict an outcome using a set of attributes and dimensions. For example, the decision tree may be a C4.5 decision tree that can be used as a statistical classifier. Alternatively, other decision trees may be used that are made using regulation requirements for restored data.

In certain embodiments, when the analyzer module 201 determines that data stored on a storage system 109 fails to comply with a governing regulation, the converter module 203 may attempt to convert the data stored on the storage system 109 such that the data complies with the governing regulation. For example, if an originally backed-up storage system 109 does not comply with a governing regulation, the converter module 203 may attempt to convert the data on the storage system 109 to be compliant with the governing regulation during a restore operation. In some embodiments, the converter module 203 may attempt to convert the data to become compliant with a governing regulation before the data is restored. Alternatively, the converter module 203 may attempt to convert the data to become compliant with the governing regulation after the data is restored.

In some embodiments, the converter module 203 may attempt to convert the data to become compliant with a governing regulation before the data is restored. For example, the converter module 203 may identify data that is stored on one or more backup storage devices such as a tape drive, hard drive, cloud storage, and the like. During restoration of the data stored on the one or more backup storage devices, the converter module 203 may attempt to apply regulation compliance criteria to the data.

In certain embodiments, the regulation compliance criteria may include encryption settings, access control restrictions, industry-specific security restrictions related to the regulations, and the like. For example, when converting the encryption settings to comply with the regulations, the converter module 203 may read the data from one or more backup storage devices, whereupon the converter module 203 may encrypt the read data with a regulation compliant encryption algorithm. When the data is encrypted, the converter module 203 may then restore the data on the storage system 109. Further, when converting the access control restrictions, the converter module 203 may read the data from one or more backup storage devices, whereupon the converter module 203 may apply access control restrictions that are compliant with regulations before the data is restored to the storage system 109. Additionally, when converting industry-specific security restrictions, the converter module 203 may read the data from the one or more backup storage devices, whereupon the converter module 203 applies security policies and processes regarding data that comply with the industry-specific security restrictions before the data is restored back on the storage system 109. When the industry-specific security restrictions are applied, the data may be restored on the storage system 109.

In other embodiments, the converter module 203 may be unable to convert the data to comply with regulations before data is restored to a storage system 109. When the converter module 203 is unable to convert the data to comply with regulations before data is restored to a storage system 109, the restoration system 101 may proceed with restoring the storage system 109. When the restoration system 101 completes the restoration of the storage system 109, the converter module 203 may process the restored data and update it to comply with the regulations. For example, with respect to the updating of access control restrictions, the converter module 203 may read data from one or more backup storage devices, where the restoration system 101 restores the data onto a storage system 109. When the restoration operation completes, the converter module 203 may apply access control restrictions to the restored data that are compliant with the regulations. In an additional example, the restoration system 101 may read data from the one or more backup storage devices and restore the data to the storage system 109. When the data is restored on the storage system 109, the converter module 203 may apply industry specific security policies to the restored data.

In certain embodiments, when the converter module 203 has converted the data to comply with the regulations and the restoration system 101 has restored the data to the storage system 109, the validator module 205 may validate that the converted storage system 109 complies with the regulations. The validator module 205 may validate that both the configuration of the storage system 109 and the data stored in the storage system 109 comply with the regulations. For example, when the restoration system 101 has completed restoration of the data to the storage system 109, the validator module 205 may verify that an access control specification for the restored data on the storage system 109 complies with the regulations. Further, the validator module 205 may verify that personal data may only be accessed by designated persons within an organization. Additionally, the validator module 205 may verify that personal data may only be accessed for an explicit purpose that is associated with an initial reason for which the personal data was collected. The validator module 205 may also further verify that the restored data complies with other rules, articles, and settings dictated by the regulations.

In further embodiments, the validator module 205 may perform a series of tests to verify whether or not data restored to the storage system 109 adheres to the regulations. For example, the validator module 205 may check that selected categories of data stored on the storage system 109 are encrypted. Additionally, the validator module 205 may check whether the storage system 109 saves the restored data in specific types of underlying storage based on a categorization of the data. Also, the validator module 205 may determine whether selected data sets (including audit logs) are marked as immutable. Further, the validator module 205 may check whether data stored on the storage system 109 complies with a right to erase. When the validator module 205 has validated that the storage system 109 complies with regulations, a user may trust that their data is stored in such a way that the storage of the data complies with governing regulations.

Figure 3:
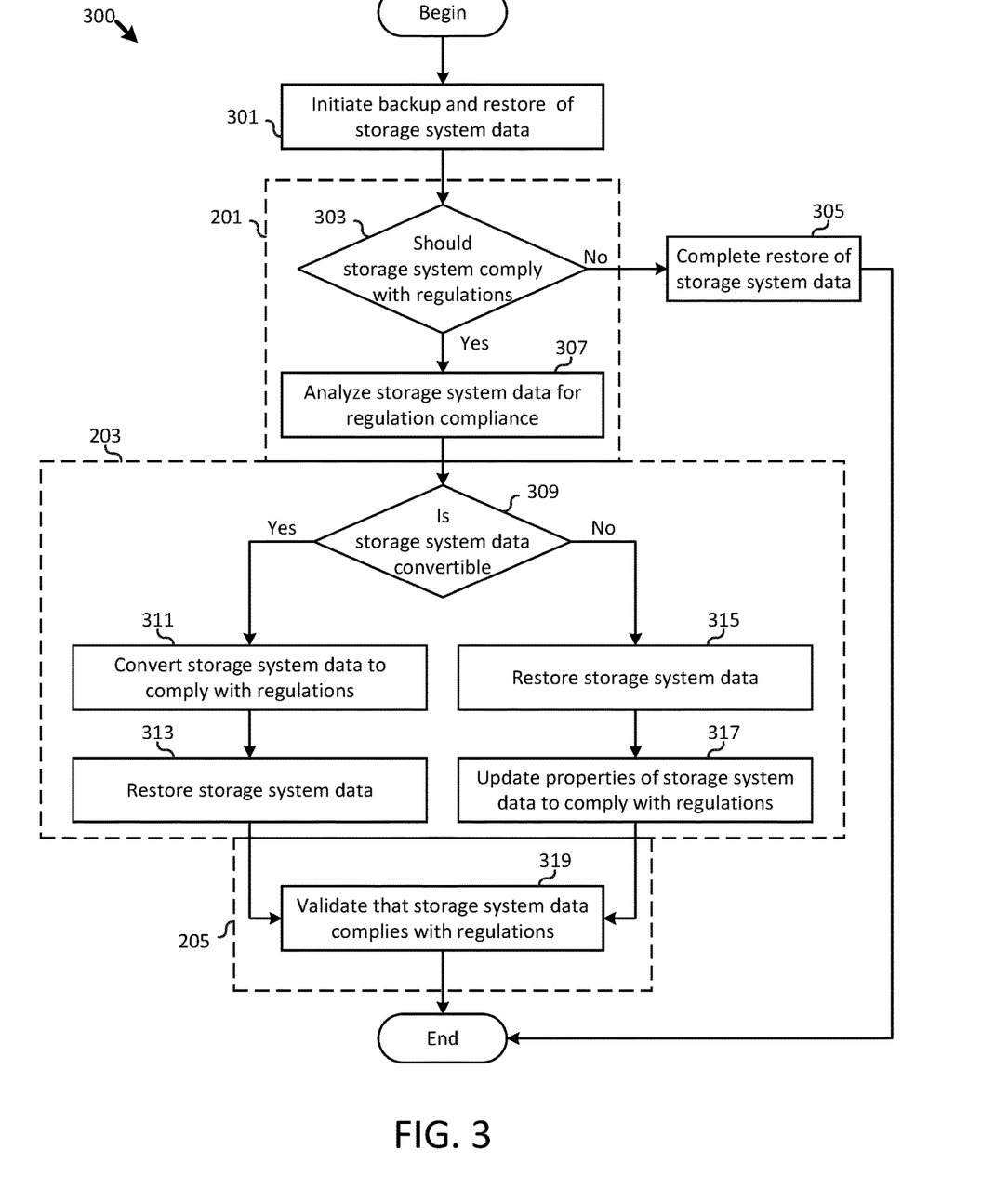
FIG. 3 is a flowchart diagram illustrating one embodiment of a method for providing automatic regulation compliance for backing up and restoring storage system data in a storage environment.

FIG. 3 is a flow chart diagram illustrating one embodiment of a method 300 for providing automatic regulation compliance for backing up and restoring storage system data in a storage environment. As illustrated, portions of the method 300 are illustrated as being respectively performed by the analyzer module 201, the converter module 203, and the validator module 205. The method 300 proceeds at 301 where a backup and restore of storage system data is initiated. For example, as described above, one or more storage devices may store backed-up data, where the data may be ready for restoration on a storage system 109. The restoration system 101 may initiate the restoration of the backed-up data.

In certain embodiments, when the restoration system 101 initiates the restoration of the backed-up data, the processor 103 on the restoration system 101 may execute the analyzer module 201. Accordingly, the method 300 proceeds at 303 where the analyzer module 201 determines whether a storage system 109 should comply with regulations. If the analyzer module 201 determines that the storage system 109 should not comply with regulations, the method 300 proceeds at 305 where the restoration of storage system data is completed. In some situations, the backed-up data may be of a data type that is not governed by the regulations. Accordingly, the restoration system 101 may restore the backed-up data without converting the backed-up data to comply with the regulations. When the restoration of the storage system 109 is completed, the method 300 ends.

Alternatively, at 303, when the analyzer module 201 determines that the backed-up data should comply with the regulations, the method 300 proceeds at 307, where the storage system data is analyzed for regulation compliance. For example, the analyzer module 201 may analyze the storage system 109 and the data stored on the storage system 109 to determine if the storage system 109 and storage system data comply with the regulation. In some embodiments, the analyzer module 201 may compare the storage system 109 and storage system data against various rules and articles defined in an applicable regulation. Based on the comparison, the analyzer module 201 may determine that backed-up data is not compliant with regulations. In certain embodiments, the analyzer module 201 may determine how the backed-up data fails to comply with the regulations.

In certain embodiments, when the analyzer module 201 determines that the backed-up data is not compliant with regulations, the processor 103 on the restoration system 101 may execute the converter module 203. Accordingly, the method 300 proceeds at 309 where the converter module 203 determines whether the storage system data is convertible. As described above, the storage system data is convertible when the backed-up data can be converted to be compliant with regulations without first restoring the data. When the converter module 203 determines that the storage system data is convertible, the method 300 proceeds at 311 where the storage system data is converted to comply with regulations. When the data is converted, the method 300 proceeds at 313 where the storage system data is restored. Alternatively, when the converter module 203 determines that the storage system data is not convertible, the method 300 proceeds at 315, where the storage system data is restored. When the storage system data is restored, the method 300 proceeds at 317, where the properties of the storage system data are updated to comply with regulations.

In some embodiments, when the converter module 203 has either converted the storage system data to be compliant with regulations or updated properties of the storage system data to comply with regulations, the processor 103 on the restoration system 101 may execute the validator module 205. Accordingly, the method 300 proceeds at 319 where the compliance of the storage system data with the regulations is validated. For example, the validator module 205 may check various properties and settings of the storage system data to validate that the storage system data complies with regulations. When the validator module 205 validates that the storage system data complies with regulations, the method 300 ends.

Figure 4:
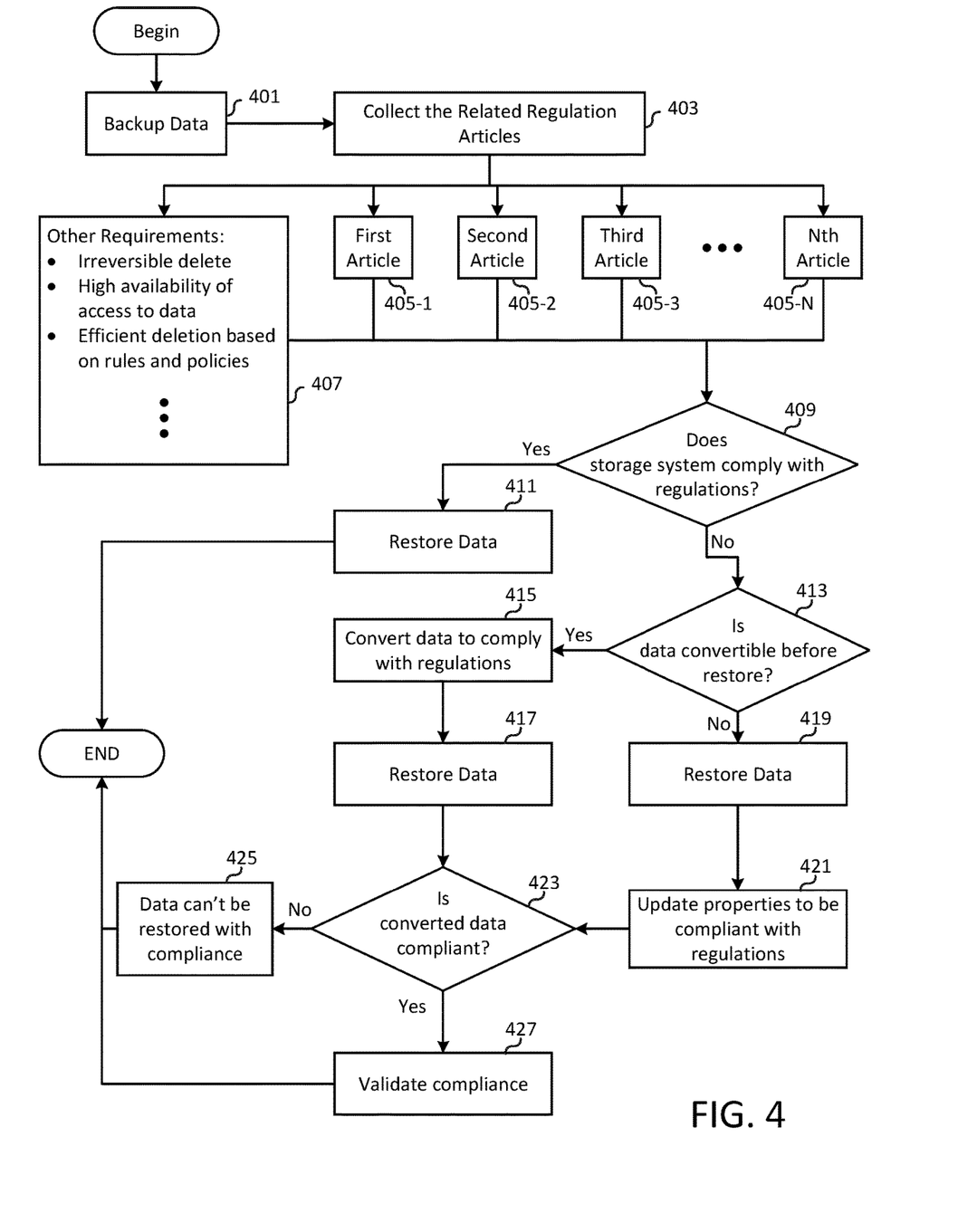
FIG. 4 is a flowchart diagram illustrating an embodiment of a further method for providing automatic regulation compliance for backing up and restoring storage system data in a storage environment.

FIG. 4 is a flow chart diagram illustrating a further embodiment of a method 400 for providing automatic regulation compliance for backing up and restoring storage system data in a storage environment. Method 400 begins at 401 where backed-up data is identified for restoration by the restoration system 101. When the backed-up data is identified, method 400 proceeds at 403, where related regulation articles are collected. For example, the restoration system 101 may identify applicable articles 405 that are described in the regulation database 107. Further, where the regulation is GDPR, a first article 4051 may be associated with article 32 of the GDPR, which regulates the securing of personal data. Additionally, a second article 405-2 may be associated with article 17 of the GDPR, which regulates rights related to the erasing of data. Also, a third article 405-2 may be associated with article 15 of the GDPR, which regulates rights of access. Further, an Nth article 405-N may be associated with article 25 of the GDPR, which regulates data protection. As described herein, the articles 405-1-405-N may be referred to collectively as articles 405 or generally as article 405.

In further embodiments, when the restoration system 101 collects the related regulation articles, the restoration system 101 may also identify other requirements 407 for being compliant with a governing regulation. For example, other requirements 407 may include whether or not the storage system 109 permits irreversible deletes of data stored on the storage system 109. Additionally, the other requirements 407 may specify a level of availability for accessing the data stored in the storage system 109. Also, the other requirements 407 may delineate a process for efficiently deleting data based on rules and policies. Other requirements 407 may include other rules and policies as called for by a governing regulation.

In additional embodiments, when the restoration system 101 collects the related regulation articles and requirements, the method 400 may proceed at 409, where the method 400 determines whether a backed-up data complies with regulations. When determining whether or not the backed-up data complies with regulations, the restoration system 101 may use a decision tree on the different rules and articles. If the backed-up data complies with regulations, the method 400 may proceed at 411, where the method 400 restores the data. For example, the method 400 may restore the backed-up data onto a storage system 109. As the restored data complies with regulations, the method 400 ends.

In certain embodiments, when the method 400 determines that the backed-up data fails to comply with regulations, the method 400 may proceed at 413, where the method 400 may determine whether or not the backed-up data is convertible before the restoration system 101 restores the data. When the data is convertible before the restoration system 101 restores the data, the method 400 may proceed at 415, where the backed-up data is converted to comply with regulations. When the backed-up data complies with the regulations, the method 400 may proceed at 417, where the backed-up data is restored. Alternatively, when the data is not convertible before the restoration system 101 restores the data, the method 400 may proceed at 419, where the backed-up data is restored by the restoration system 101. As the restored data is not compliant with the regulations, the method 400 may then proceed at 421, where the properties of the restored data are updated to be compliant with the regulations.

In some embodiments, when the backed-up data is either converted and restored or restored and properties updated, the method 400 proceeds at 423, where the method 400 determines whether the converted data is compliant. To determine whether or not the converted data is compliant, the restoration system 101 may check whether or not the converted data complies with articles and rules defined in the regulations. If the restoration system 101 determines that the data complies with the regulations, the method 400 proceeds at 427, where the compliance is validated by the restoration system 101 and the method ends. If the restoration system 101 determines that the data does not comply with the regulations, the method 400 proceeds at 425, where the restoration system 101 indicates that the backed-up data cannot be restored while complying with the regulations and the method ends.

Figure 5:
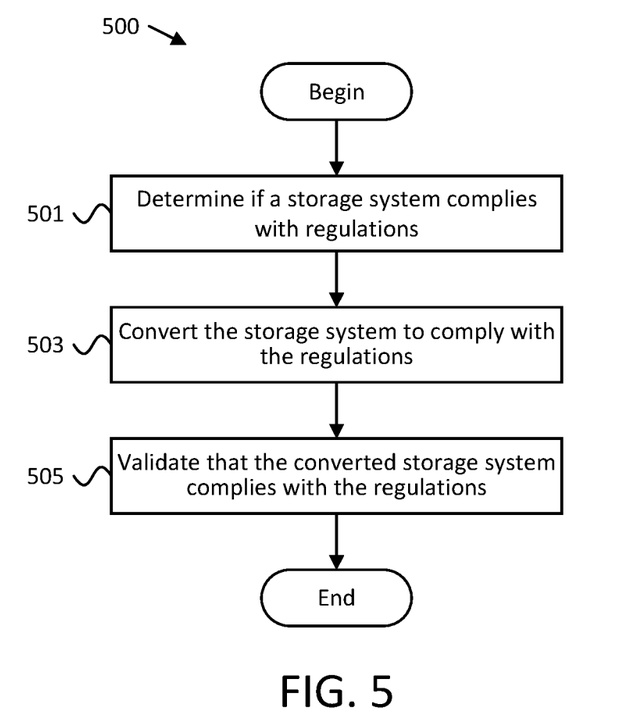
FIG. 5 is a flowchart diagram illustrating an embodiment of a further method for providing automatic regulation compliance for backing up and restoring storage system data in a storage environment.

FIG. 5 is a flow chart diagram illustrating a further embodiment of a method 500 for providing automatic regulation compliance for backing up and restoring storage system data in a storage environment. The method 500 proceeds at 501, where whether the storage system 109 complies with regulations is determined. Additionally, the method 500 proceeds at 503, where the storage system 109 is converted to comply with the regulations. Further, the method 500 proceeds at 505, where the compliance of the converted storage system 109 with regulations is validated. Method 500 then ends.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system comprising:
an analyzer module that determines if a storage system complies with regulations;
a converter module that converts the storage system to comply with the regulations in response to determining that the storage system does not comply with the regulations; and
a validator module that validates that the converted storage system complies with the regulations,
wherein the converter module determines whether the storage system is convertible to comply with the regulations before restoration of the storage system, and
wherein at least a portion of each of said modules comprise one or more of a set of hardware circuits, a set of programmable hardware devices, and executable code stored on a set of non-transitory computer-readable storage media.

2. The system of claim 1, wherein the analyzer module determines that the storage system complies with regulations based on analyzing attributes of the storage system.

3. The system of claim 2, wherein the attributes of the storage system are selected from the group consisting of:
a storage system extended attribute;
access control settings for the storage system; and
an enterprise security level.

4. The system of claim 1, wherein the converter module performs the restoration of the storage system after the storage system is converted based upon the determination of whether the storage system can be converted before the restoration of the storage system.

5. The system of claim 1, wherein the regulations are specified as part of general data protection regulation (GDPR).

6. The system of claim 1, wherein the analyzer module determines that the storage system complies with the regulations based on one or more articles defined in the regulations.

7. The system of claim 6, wherein the analyzer module uses a decision tree to determine whether the storage system complies with the one or more articles.

8. A method comprising:
   determining if a storage system complies with regulations;
   converting the storage system to comply with the regulations in response to determining that the storage system does not comply with the regulations; and
   validating that the converted storage system complies with the regulations,
   wherein converting the storage system further comprises determining whether the storage system is convertible to comply with the regulations before restoration of the storage system.

9. The method of claim 8, wherein determining if a storage system complies with regulations further comprises determining that the storage system complies with regulations based on analyzing attributes of the storage system.

10. The method of claim 9, wherein the attributes of the storage system are selected from the group consisting of:
    a storage system extended attribute;
    access control settings for the storage system; and
    an enterprise security level.

11. The method of claim 8, further comprising performing the restoration of the storage system after the storage system is converted based upon the determination of whether the storage system can be converted before the restoration of the storage system.

12. The method of claim 8, wherein the regulations are specified as part of general data protection regulation (GDPR).

13. The method of claim 8, wherein determining if a storage system complies with regulations further comprises determining that the storage system complies with the regulations based on one or more articles defined in the regulations.

14. The method of claim 13, wherein determining if a storage system complies with regulations further comprises using a decision tree to determine whether the storage system complies with the one or more articles.

15. A computer program product comprising a computer-readable storage medium including program instructions embodied therewith, the program instructions executable by a processor to cause the processor to:
    determine if a storage system complies with regulations;
    convert the storage system to comply with the regulations in response to determining that the storage system does not comply with the regulations; and
    validate that the converted storage system complies with the regulations,
    wherein the program instructions further cause the processor to determine whether the storage system is convertible to comply with the regulations before restoration of the storage system.

16. The computer program product of claim 15, wherein the program instructions further cause the processor to determine that the storage system complies with regulations based on analyzing attributes of the storage system.

17. The computer program product of claim 15, wherein the program instructions further cause the processor to perform the restoration of the storage system after the storage system is converted based upon the determination of whether the storage system can be converted before the restoration of the storage system.

* * * * *